United States Patent Office 3,403,975
Patented Oct. 1, 1968

3,403,975
SYNTHESIS AND DECOMPOSITION OF AMMONIA
Vincent J. Frilette, Cherry Hill, and Daniel G. Jones, Pennington, N.J., assignors to Mobil Oil Corporation, a corporation of New York
No Drawing. Filed Nov. 20, 1964, Ser. No. 412,822
12 Claims. (Cl. 23—198)

ABSTRACT OF THE DISCLOSURE

A process for the decomposition of ammonia which comprises contacting a charge containing ammonia with a catalyst comprising a crystalline substantially nonreducible metal aluminosilicate salt having an ordered internal structure at a temperature of from about 300° C. to about 1000° C. The ordered internal structure of the aluminosilicate has a defined pore size from about 3.5 A. to about 15 A. in diameter.

A process for effecting synthesis of ammonia is also disclosed, in which hydrogen and nitrogen are contacted with certain crystalline aluminosilicate catalysts under appropriate synthesis conditions.

---

This invention relates to the synthesis and decomposition of ammonia. In particular, this invention relates to new aluminosilicate catalyst compositions, to methods for producing the same, and to processes in which these and other aluminosilicate catalysts are employed to effect the synthesis or decomposition of ammonia.

This invention contemplates processes for controlling the reversible reactions between ammonia and its synthesis gases, nitrogen and hydrogen, in the presence of catalysts of substantially nonreducible metal aluminosilicate salts under conditions appropriate for the intended conversion. Preferably, crystalline aluminosilicates are employed as catalysts for this invention.

In addition, this invention also contemplates new crystalline aluminosilicate catalyst compositions having unique activity for the synthesis or decomposition of ammonia that are prepared by adding various metal compounds to their amorphous silica and alumina precursors prior to crystallization. This invention still further contemplates new catalyst compositions that are prepared by admixing a substantially nonreducible metal aluminosilicate salt with reducible iron-rich spinels and thereafter reducing the spinel to metallic iron.

In accordance with this invention it has been found that the reversible reactions between ammonia and a mixture of hydrogen and nitrogen; that is, the reactions that occur during the synthesis and decomposition of ammonia can be effected catalytically in the presence of substantially nonreducible metal aluminosilicate salts under conditions appropriate for the intended reaction.

Also it has also been found that the catalytic activity of the crystalline substantially nonreducible metal aluminosilicate salts can be modified and enhanced by base exchange with other cations, by incorporation of various metal compounds during their crystallization, or by incorporating metals or reducible metal salts within their interstitial channels after crystallization. In addition, it has been found such metal aluminosilicate salts may be admixed with reducible iron-rich spinels so that subsequent reduction to metallic iron forms effective catalyst compositions for the purposes of the invention.

The synthesis and decomposition of ammonia in accordance with this invention can be illustrated by the following reversible equation:

$$N_2 + 3H_2 \rightarrow 2NH_3$$

Nitrogen suitable for use as a feed gas for the synthesis of ammonia by the present invention may be derived from several sources. For example, nitrogen may be obtained from the air by liquefaction and fractionation, by removing the oxygen from the air by burning hydrogen, or by removing nitrogen from an industrial byproduct gas. Exemplary of some of these industrial gases are producer gas, combustion gases, and the blowdown gas from a water-gas producer unit.

The hydrogen used as a synthesis gas can also be obtained by conventional methods from many sources including water-gas, coke-oven gas, natural gas, catalytic reformer gases, fuel oil and the electrolysis of water or brine. These synthesis feed gases may contain small amounts of low molecular weight hydrocarbons, carbon monoxide, carbon dioxide, hydrogen sulfide, sulfur dioxide and/or the like, but preferably the synthesis gases are purified to be substantially free of such impurities.

In the synthesis of ammonia various amount of nitrogen and hydrogen may be used. Usually, nitrogen will be used at least about ninety percent of stoichiometric proportions; that is, for stoichiometric calculations, one mole of nitrogen is considered to react with three moles of hydrogen. It will be appreciated that nitrogen may be used in excess of this molar ratio but optimum results are usually obtained at the stoichiometric ratio of 1:3.

It will also be appreciated that the temperatures and pressures employed for controlling the equilibrium between ammonia and a mixture of hydrogen and nitrogen are dependent on whether synthesis or decomposition of ammonia is desired. Because the synthesis reaction between hydrogen and nitrogen is exothermic and also because the combined volumes of the reactants are greater than the volume of ammonia product, low temperatures and high pressures favor the synthesis of ammonia. Advantageously, in accordance with this invention, reaction temperatures of nitrogen and hydrogen in the presence the aluminosilicate catalysts can vary over a wide range from as low as about 100° C. to about 550° C. Preferably the synthesis of ammonia is carried out from about 250° to 500° C.

The decomposition of ammonia also can be conducted at temperatures varying over a wide range, the temperature being determined by the expediency of the catalyst employed. Thus, the decomposition is generally conducted at temperatures above about 500° C. and often from about 600° C. to about 1000° C., the upper limit being determined by the stability, etc. of the particular catalyst employed. In some instances when using particularly active crystalline aluminosilicate catalysts, temperatures considerably below 500° C., i.e., about 300° C., can be employed to effect the decomposition of ammonia.

The processes of this invention can be conducted at subatmospheric, atmospheric or superatmospheric pressure. Atmospheric pressure is advantageous for the decomposition reaction and may be used for synthesis, although supra-atmospheric pressure is preferred in the latter reaction. In some instances synthesis of ammonia may be effected at pressures in excess of about 100 atmospheres, depending on the temperatures employed, the activity of the particular catalyst utilized, etc.

The amount of aluminosilicate catalyst used will vary, and depend, in part, on the activity of the catalyst as well as the feed rates of the reactants.

In continuous or semicontinuous operations for the synthesis of ammonia in which one or more reactor vessels are employed with cyclic regeneration of the catalyst, the amount of aluminosilicate used, as measured in terms of the hourly space velocity of the nitrogen, can be in the range of about 100 to about 2000.

Likewise decomposition of ammonia also operates at relatively high space velocities of from about 200 to 4000 volumes of ammonia (measured at 25° C. and 1 atmosphere of pressure) per volume of catalyst per hour and will be dependent, in part, on the activity of the catalyst, the temperature and pressure employed, etc.

It is to be understood that the aluminosilicate catalysts can be regenerated by burning off their contaminants at a temperature of about 550° C. in a current of dry air, for example.

The catalysts of this invention include substantially nonreducible metal aluminosilicate salts which may be either natural occurring or synthetically produced and particularly the crystalline aluminosilicate salts that have an ordered internal structure characterized by an internal system of pores, channels or cavities of sufficient free diameters to permit passage of ammonia. As used herein, the term "nonreducible metal" when used with reference to the aluminosilicates of this invention, may be defined as those elements which form oxides that are at least as difficult to reduce to a metal in an hydrogen atmosphere as is manganese dioxide. Thus, included within the scope of the term nonreducible metal are those metals which have a heat of formation of the oxide per gram mol of oxygen equal to or greater than manganese dioxide. Thus, the metals suitable for use in accordance with this invention include aluminum and manganese, the alkali, i.e., lithium, sodium, potassium, and the like, and alkaline earth, i.e., mangnesium, calcium, strontium, barium, and the like, metals, as well as yttrium, lanthanum, cerium and other rare earth metals as set forth, for example, in "Inorganic Chemistry," Fritz Ephraim, Nordeman Publishing Co., pages 193, 194, 441 (1943).

It is to be understood, however, that while reducible metals, for example, iron, cobalt, nickel, silver, cadmium and zinc are excluded from the above definition, such reducible metals may be partially exchanged with the non-reducible elements of this invention. Generally, the ratio of reducible to nonreducible element, calculated as metal, is limited so as not to exceed 0.6. The ratio of reducible to nonreducible metal cations preferably does not exceed 0.3 for zeolites with a silicon to aluminum atom ratio of less than 3 but may, however, be increased to as much as 0.99 for zeolites with a silicon to aluminum ratio greater than 3, for in the latter case, greater stability may be expected even though the metal and hydrogen zeolite are likely to be produced under reaction conditions.

The aluminosilicate catalysts of this invention contain an abundance of cation sites which are generated by the electrostatic unbalance of charge produced by the aluminum atoms in the rigid skeletal framework. These cations are present regardless of whether the aluminosilicate occurs in nature, or is prepared synthetically in the laboratory, or is base exchanged by contacting the natural or synthetic aluminosilicate with a wide variety of salt solutions.

The techniques and requirements with respect to altering the cation population of a natural or synthetic aluminosilicate are, in general, well known in the art. Briefly, the aluminosilicate may be contacted for various lengths of time with aqueous solutions of salts, or mixtures of salts, at ambient or elevated temperatures, and after completion of this stage of the treatment the solid products are separated from the solution and any excess salt solution sorbed by the solid is removed from the solid by rinsing. The solids are then dried and activated by heating to form a dehydrated crystalline product having a system of internal pores, passages or cavities within an ordered internal structure. The cation composition of the solids resulting from the treatment will be governed by the rate of exchange of the cations, the time of contact, the conditions of contact, and the laws of equilibrium.

The alkali and alkaline earth metal salts of the crystalline aluminosilicate are particularly effective catalysts for the decomposition of ammonia. Among the most suitable crystalline aluminosilicates are those which exhibit high thermal stability. Of particular note in this regard is mordenite, it being preferred to use this mineral in the form of its alkali metal salt.

Another group of catalysts which are particularly effective and in many cases the most preferred, are the crystalline synthetic aluminosilicate salts which are crystallized in the presence of an added metal compound, i.e., a compound containing one of the transition elements, in the form of a complex anion such as sodium ferrate.

One method in which these metal containing crystalline aluminosilicate salts are prepared comprises mixing measured quantities of sodium aluminate and sodium silicate solutions together with a solution of the added metal compound. After mixing, the mixture of salt solutions is allowed to stand for several hours at an elevated temperature, i.e., about 100° C., under an inert atmosphere. Then the salt mixture is cooled, and the crystalline solids are removed by filtration or other similar separation techniques. These solids are water-washed and dried at high temperatures to form the crystalline aluminosilicate containing a minor amount of the added metal in a catalytically very effective form which is substantially different in magnitude of effectiveness compared with a crystalline aluminosilicate which contains the same amount of metal introduced subsequent to the crystallization. It will be appreciated that a variety of metal compounds may be used to modify the aluminosilicate crystal. Exemplary of the compounds that can be employed are those which contain the metal as metal-amine complexes and complex anions especially. Examples of these are ferrates, ferrites, molybdates, molybdites, tungstates and stannates. In general, the quantity of the metal compound added to the amorphorous precursors is sufficient to provide from about 0.003 to about 3.0 weight percent of the metal within the aluminosilicate crystal, and in any case the amount added should be such that it does not interfere with crystallization.

It will be appreciated that in addition to sodium silicate other sources of silica, including silica gel, silicic acid and the like, may be used in preparing the aluminosilicate catalysts. Also, the alumina may be obtained from activated alumina, alpha alumina, gamma alumina, alumina trihydrate, alumina hydroxide, or other alkali metal alumina aluminates. In general, the proportions of these precursor components are determined by the type of aluminosilicate structure to be produced. Thus, aluminosilicates of the faujasite type, including mordenite, zeolite X, zeolite Y, zeolite L, and the aluminosilicates designated as zeolite A, B, D, Q, F, R, S, T, ZK-4 and ZK-5 and the like may be crystallized in the presence of various metal compounds so as to have a modified ordered internal structure. (These zeolites are hereinafter described in greater detail.)

It has also been found that the activity of the heretofore described aluminosilicate catalysts may be further modified by incorporating within the ordered internal structure of the aluminosilicate a metal or sufficient reducible metal salt to provide at least about 0.1 weight percent of metal after reduction, but less than is required to destroy porosity as indicated by at least a four percent sorption of carbon dioxide at 500 mm. and 25° C. Advantageously, a variety of methods may be used to incorporate elemental metals within the aluminosilicate catalysts. One of such methods comprises base exchange with a reducible metal salt, followed by separating the aluminosilicate from the exchanging solution, drying the aluminosilicate to remove substantially all of the water, and thereafter contacting the aluminosilicate with a reducing agent such as alkali metal vapors or hydrogen at elevated temperatures for sufficient periods of time whereby the cations of the metal deposited are reduced to elemental metal. Another method for incorporating a metal within the aluminosilicate involves contacting a dehydrated aluminosilicate material in an inert atmosphere with a fluid decomposable compound of a metal. Subsequently, the decomposable compound may be reduced with a reducing agent so as to form the elemental metal within the aluminosilicate. Exemplary of some of the decomposable metal compounds that can be reduced are the carbonyls, carbonyl hydrides, metal alkyls, other organo-metallo compounds and the like. The metals which may be incorporated within the aluminosilicate crystal include, iron, zinc, gold, copper, platinum, tin, lead, tungsten, silver, hafnium, and the like.

In accordance with this invention, it has also been found that the substantially nonreducible aluminosilicate catalysts previously described may be admixed with the reducible iron-rich spinels which are often used as catalyst materials. These iron-rinch spinels may be represented by the following formula:

$$M'M''_2O_4$$

Wherein M' is magnesium, zinc, manganese, or ferrous iron, and M" is aluminum, chromium, manganese or ferric iron, with either M' or M" or both being iron. Also these reducible spinels may be singly, doubly or multiply promoted by the addition of oxides of chromium, potassium, magnesium and aluminum. Preferably, the spinels and aluminosilicate are mixed in such proportions as to provide at least fifty percent by weight metallic iron calculated after reduction of the mixture in an atmosphere such as hydrogen. Apparently, the aluminosilicate provides a high surface area adsorbent for the removal of catalytic poisons as well as functioning as a catalyst. Representative of some of the reducible iron-rich spinels that may be used are magnetite, magnesio ferrite and the like.

It will be appreciated that the activity of aluminosilicate catalysts of this invention is dependent, in part, upon the stability and the concentration of the active cation sites within its ordered internal structure. In general, the stability and distribution of the active cation sites formed within aluminosilicate is affected by its silicon to aluminum atomic ratio. In an isomorphic series of crystalline aluminosilicates, the substitution of silicon for aluminum in the rigid framework of the lattice results in a decrease of total cation sites as evidenced by the reduction of exchange capacity and proved by elemental analysis of the aluminosilicate. Accordingly, among the faujasite isomorphs, zeolites known as Y will have a sparser distribution in cation sites within its pores than the zeolite known as X. In addition, it has also been found that the aluminosilicates having a high silicon to aluminum atomic ratio are particularly desirable as catalysts for the purposes of this invention. As a rule the ratio of silicon to aluminum atoms is at least about 1.5 to 1 in the preferred type of catalysts. Especially preferred are those which have a ratio greater than 3 to 1. These catalysts are readily contacted with solutions that may be acidic in nature and are readily regenerated after having been used by contact at elevated temperatures with an oxygen containing stream under conrolled conditions such that carbonaceous residues can be efficiently removed without damage to the essential structure or the properties of the aluminosilicate.

It will be appreciated that the unique activity of the aluminosilicate catalysts for effecting the reactions of the present invention is also dependent upon the accessibility of its active cation sites and/or the elemental metal contained therein. Thus, the defined pore size of the crystalline aluminosilicate should be considered during its preparation. The aluminosilicate preferably should have a pore size of such dimensions that it can accept the reactants of the present process within its ordered internal structure and allows egress of the ammonia product. Consequently, the pore size should be at least about 3.5 A. in diameter and preferably from about 3.5 A. to about 15 A. in diameter.

Typical of the aluminosilicates employed in accordance with this invention, are several aluminosilicates, both natural and synthetic, which have a defined pore size of from 3.5 A. to 15 A. within an ordered internal structure. These aluminosilicates can be described as a three dimensional framework of $SiO_4$ and $AlO_4$ tetrahedra in which the tetrahedra are cross-linked by the sharing of oxygen atoms whereby the ratio of the total aluminum and silicon atoms to oxygen atoms is 1:2. In their hydrated form, the aluminosilicates may be represented by the formula:

$$M_{2/n}O:Al_2O_3:wSiO_2:yH_2O$$

wherein M is a cation which balances the electrovalence of the tetrahedra, $n$ represents the valence of the cation, $w$ the moles of $SiO_2$, and $y$ the moles of $H_2O$. The cation can be any one or more of a number of metal ions depending on whether the aluminosilicate is synthesized or occurs naturally. Typical cations include sodium, lithium, potassium, calcium, and the like. Although the proportions of inorganic oxides in the silicates and their spatial arrangement may vary, effecting distinct properties in the aluminosilicates, the two main characteristics of these materials are the presence in their molecular structure of at least 0.5 equivalent of an ion of positive valence per gram atom of aluminum, and an ability to undergo dehydration without substantially affecting the $SiO_4$ and $AlO_4$ framework.

One of the crystalline aluminosilicates utilized by the present invention is the synthetic faujasite designated as zeolite X, and is represented in terms of mole ratios of oxides as follows:

$$1.0 \pm 0.2 M_{2/n}O:Al_2O_3:2.5 \pm 0.5 SiO_2:yH_2O$$

wherein M is a cation having a valence of not more than 3, $n$ represents the valence of M, and $y$ is a value up to 8, depending on the identity of M and the degree of hydration of the crystal. The sodium form may be represented in terms of mole ratios of oxides as follows:

$$0.9Na_2O:Al_2O_3:2.5SiO_2:6.1H_2O$$

Zeolite X is commercially available in both the sodium and the calcium forms.

It will be appreciated that the crystalline structure of zeolite X is different from most zeolites in that it can adsorb molecules with molecular diameters up to about 10 A.; such molecules including branched chain hydrocarbons, cyclic hydrocarbons, and some alkylated cyclic hydrocarbons.

Other aluminosilicates are contemplated as also being effective catalytic materials for the invention. Of these other aluminosilicates, a synthetic faujasite, having the same crystalline structure as zeolite X and designated as zeolite Y has been found to be active. Zeolite Y differs from zeolite X in that it contains more silica and less alumina. Consequently, due to its higher silica content this zeolite has more stability to the hydrogen ion than zeolite X.

Zeolite Y is represented in terms of mole ratios of oxides as follows:

$$0.9 \pm 0.2 Na_2O:Al_2O_3:wSiO_2:xH_2O$$

wherein $w$ is a value greater than 3 up to about 5 and $x$ may be a value up to about 9.

The selectivity of zeolite Y for larger molecules is appreciably the same as zeolite X because its pore size extends from 10 A. to 13 A.

Another synthesized crystalline aluminosilicate, designated as zeolite A, has been found to be effective for the purposes of this invention. This zeolite may be represented in mole ratios of oxides as:

$$1.0 \pm 0.2 M_{2/n}O:Al_2O_3:1.85 \pm 0.5 SiO_2:yH_2O$$

wherein M represents a metal, $n$ is the valence of M, and $y$ is any value up to about 6.

The sodium form of this zeolite may be represented by the following formula:

$$Na_{12}(AlO_2)_{12}(SiO_2)_{12} \cdot 27H_2O$$

This material often designated as a "4A" zeolite, has a pore size of about 4 A. in diameter. When the sodium cations have been substantially replaced with calcium by conventional exchange techniques, the resulting zeolite is designated as a "5A" zeolite and has a defined pore size of about 5 A. in diameter.

Other aluminosilicate materials found to be active in the present process are designated as mordenite and mordenite-like structures. These zeolites have an ordered crystalline structure having a ratio of silicon atoms to aluminum atoms of about 5 to 1. In its natural state mordenite usually occurs as a salt of sodium, calcium and/or potassium. The pure sodium form may be represented by the following formula:

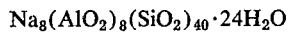

Mordenite has an ordered crystalline structure made up of chains of 5-membered rings of tetrahedra. In its sodium form the crystal is believed to have a system of parallel channels having free diameters of about 4.0 A. to about 4.5 A., interconnected by smaller channels, parallel to another axis, on the order of 2.8 A. free diameters. Advantageously, in certain ionic forms, e.g., acid exchanged, the mordenite crystal can have channels with effective free diameters of from about 6.5 A. to about 8.1 A. As a result of this crystalline framework, mordenite in proper ionic forms, sorbs benzene and other cyclic hydrocarbons.

It will be appreciated that other aluminosilicates can be employed as catalysts for the processes of this invention. A criterion for each catalyst is that its ordered internal structure must have defined pore sizes of sufficient diameters to allow entry of the preselected reactants and the formation of the desired reaction products. Furthermore, the aluminosilicate advantageously should have ordered internal structure capable of chemisorbing or ionically bonding additional metals and/or hydrogen ions within its pore structure so that its catalytic activity may be altered for a particular reaction. Among the naturally occurring crystalline aluminosilicates which can be employed are faujasite, heulandite, clinoptilolite, chabazite, gmelinite, mordenite and mordenite-like structures, and dachiardite.

It has been found that the sodium form of zeolite X having a pore size of about 13 A. may serve a catalyst or a catalyst precursor for the present invention. This aluminosilicate is a commercially available zeolite designated as Linde (13X). For example, a particularly effective catalyst may be prepared from zeolite X by conventional base exchange involving the partial or complete replacement of the sodium ions by contact with a fluid medium containing cations of a transition element, i.e., iron. Any medium that will effect ionization without affecting the crystalline structure of the zeolite may be employed. As heretofore described, after such treatment the resulting exchanged zeolite product is water-washed, dried and dehydrated. The dehydration thereby produces the characteristic system of open pores, passages or cavities of the crystalline aluminosilicate. In a similar manner, zeolite X can be base exchanged with cations of the rare earth metals to provide an effective catalyst.

Advantageously, the rare earth cations can be provided from the salt of a single metal or preferable mixture of metals such as a rare earth chloride or didymium chlorides. Such mixtures are usually introduced as a rare earth chloride solution which, as used herein, has reference to a mixture of rare earth chlorides consisting essentially of the chlorides of lanthanum, cerium, praseodymium, and neodymium, with minor amounts of samarium, gadolinium, and yttrium. This solution is commercially available and contains the chlorides of a rare earth mixture having the relative composition cerium (as $CeO_2$) 48% by weight, lanthanum (as $La_2O_3$) 24% by weight, praseodymium (as $Pr_6O_{11}$) 5% by weight, neodymium (as $Nd_2O_3$) 17% by weight, samarium (as $Sm_2O_3$) 3% by weight, gadolinium (as $Gd_2O_3$) 2% by weight, yttrium (as $Y_2O_3$) 0.2% by weight, and other rare earth oxides 0.8% by weight. Didymium chloride is also a mixture of rare earth chlorides, but having a low cerium content. It consists of the following rare earths determined as oxides: lanthanum, 45–46% by weight; cerium, 1–2% by weight; praseodymium, 9–10% by weight; gadolinium, 3–4% by weight; yttrium, 0.4% by weight; other rare earths 1–2% by weight. It is to be understood that other mixtures of rare earths are equally applicable in the instant invention.

Other effective catalysts can be prepared from aluminosilicates such as zeolite Y and mordenite. Advantageously, the sodium form of zeolite Y alone can be employed as catalytic material. Also, exchange of iron, rare earth metals, or the like for the sodium cations within zeolite Y produces a highly active catalyst in a manner similar to that described for preparation of the iron and rare earth exchanged zeolite X. In addition, because of its high acid stability, zeolite Y may be treated by partially replacing the sodium ions with hydrogen ions. This replacement can be accomplished by treatment with a fluid medium containing a hydrogen ion or an ion capable of conversion to a hydrogen ion (i.e., inorganic acids or ammonium compounds or mixtures thereof).

Zeolite 4A also can serve as an effective catalyst. Also, although this zeolite material can be base exchanged with other divalent metal cations in a manner similar to that described for preparation of the rare earth exchanged faujasites preferably it is used in its sodium or potassium form.

Mordenite serves as a catalyst for the instant invention in its substantially pure sodium form. Also, mordenite may be base exchanged to replace some or all of the sodium for other cations and/or hydrogen ion or an ion convertible to hydrogen, i.e., $NH_4^+$. Before base exchange or use as catalyst, the mordenite should be reduced to a fine powder (approximately passing a 200-mesh sieve and preferably passing 300 and 325 sieves or finer). Reduction to a fine powder should be practiced for all natural zeolites which occur in coarse form so as to make fully available the extended internal cavities; such reduction may be followed by reagglomeration into a porous mass, preserving access to the interstitial spaces.

It will be appreciated that cations of other metals other than iron and the rare earths can be employed to replace the exchangeable cations from the aluminosilicates to produce effective catalysts for this invention. Exemplary of these metals are zinc, magnesium, cobalt, copper, nickel, silver, zirconium, titanium, vanadium, chromium, manganese, tungsten, osmium, and the like.

The aluminosilicate catalyst may be employed directly as a catalyst or it may be combined with a suitable support or binder. The particular chemical composition of the latter is not critical. It is, however, necessary that the support or binder employed be thermally stable under the conditions at which the conversion reaction is carried out. Thus, it is contemplated that solid porous adsorbents, carriers and supports of the type heretofore employed in catalytic operations may feasibly be used in combination with the crystalline aluminosilicate. Such materials may be catalytically inert or may possess an intrinsic catalytic activity or an activity attributable to close association or reaction with the crystalline aluminosilicate. Such materials include by way of examples, dried inorganic oxide gels and gelatinous precipitates of alumina, silica, zirconia, magnesia, thoria, titania, boria and combinations of these oxides with one another and with other components. Other suitable supports include activated charcoal, mullite, kieselguhr, bauxite, silicon carbide, sintered alumina and various clays. These supported crystalline aluminosilicates may be prepared by growing crystals of the aluminosilicate in the pores of the support. Also, the aluminosilicate may be intimately composited with a suitable binder, such as inorganic oxide hydrogel or clay, for example by ball milling the two materials together over an extended period of time, preferably in the presence of water, under conditions to reduce the particle size of the aluminosilicate to a weight mean particle diameter of less than 40 microns and preferably less than 15 microns. Also, the aluminosilicate may be combined with and distributed throughout a gel matrix by dispersing the aluminosilicate in powdered form in an inorganic oxide hydrosol. In accordance with this procedure, the finely divided aluminosilicate may be dispersed in an already prepared hydrosol or, as is preferable, where the hydrosol is characterized by a short time of gelation, the finely divided aluminosilicate may be added to one or more of the reactants used in forming the hydrosol or may be admixed in the form of a separate stream with streams of the hydrosol-forming reactants in a mixing nozzle or other means where the reactants are brought into intimate contact. The powder-containing inorganic oxide hydrosol sets to a hydrogel after lapse of a suitable period of time and the resulting hydrogel may thereafter, if desired, be exchanged to introduced selected ions into the aluminosilicate and then dried and calcined.

The inorganic oxide gel employed, as described above as a matrix for the metal aluminosilicate, may be a gel of any hydrous inorganic oxide, such as, for example, aluminous or siliceous gels. While alumina gel or silica gel may be utilized as a suitable matrix, it is preferred that the inorganic oxide gel employed be a cogel of silica and an oxide of at least one metal selected from the group consisting of metals of Groups II-A, III-B, and IV-A of the Periodic Table. Such components include for example, silica-alumina, silica-magnesia, silica-zirconia, silica-thoria, silica-beryllia, silica-titania as well as ternary combinations such as silica-alumina-thoria, silica alumina-zirconia, silica-alumina, magnesia and silica-magnesia-zirconia. In the foregoing gels, silica is generally present as the major component and the other oxides of metals are present in minor proportion. Thus, the silica content of such gels is generally within the approximate range of about 55 to about 100 weight percent with the metal oxide content ranging from zero to 45 weight percent. The inorganic oxide hydrogels utilized herein and hydrogels obtained therefrom may be prepared by any method well known in the art, such as for example, hydrolysis of ethyl orthosilicate, acidification of an alkali metal silicate and a salt of a metal, the oxide of which it is desired to cogel with silica, etc. The relative proportions of finely divided crystalline aluminosilicate and inorganic oxide gel matrix may vary widely with the crystalline aluminosilicate content ranging from about 2 to about 90 percent by weight and more usually, particularly where the composite is prepared in the form of beads, in the range of about 5 to about 50 percent by weight of the composite.

The catalyst of aluminosilicate employed in the process of this invention may be used in the form of small fragments of a size best suited for operation under the specific conditions existing. Thus, the catalyst may be in the form of a finely divided powder or may be in the form of pellets of about $\frac{1}{16}$" to about $\frac{1}{8}$" in diameter, obtained upon pelleting the aluminosilicate with a suitable binder such as clay. The zeolite X, described hereinabove, may be obtained on a clay-free basis or in the form of pellets in which clay is present as a binder.

It will be appreciated that the catalysts employed by the present invention will be dependent upon such conditions as temperature, pressure, space velocity, molar ratio of the reactants, and the like. The manner in which these conditions affect the process of this invention may be more readily understood by reference to the following specific examples.

Example I

Preparation of a catalyst by crystallization of a crystalline aluminosilicate in the presence of an added metal compound is as follows:

20.0 grams of sodium hydroxide and 1.4 grams ferric chloride were reacted in 40 ml. "deionized" distilled water and the solution was allowed to cool to room temperature. Then a slow stream of chlorine gas was passed through the solution for 10 minutes. The resulting solids gradually were brought in to a purple solution of sodium ferrate.

An aluminate solution containing 18.5 grams of sodium aluminate in 150 ml. "deionized" distilled water was filtered through a fluted filter paper into a polypropylene beaker and a silicate solution was prepared by dissolving 84.0 grams of sodium metasilicate in 250 ml. "deionized" distilled water.

The aluminate and silicate solutions were then poured together rapidly into a polypropylene beaker containing the prepared ferrate solution. The solutions were then mixed and allowed to stand for 9½ hours at 100° C. under a blanket of nitrogen. After cooling, solids were removed by filtration through a sintered glass funnel, washed with 1000 ml. "deionized" distilled water and heated in a muffle furnace for 19 hours at 350° C. Analysis of the solids (23 grams) was as follows:

| | Wt. percent |
|---|---|
| Water sorption | 26.2 |
| Cyclohexane sorptions | 13.7 |
| Iron | 1.20 |
| Sodium | 14.1 |
| Alumina | 33.1 |
| Silica | 46.4 |

X-ray analysis showed that the solids were highly crystalline products of the faujasite-type.

Example II

Two grams of the iron containing faujasite catalyst described in Example I were placed in a Pyrex tube which passed through a furnace. Electrolytic grade hydrogen was passed over a catalytic deoxidizer and mixed with high purity nitrogen pretreated over copper at 480° C. in a ratio of 3 moles of hydrogen per one mole of nitrogen. This mixture was then dried and passed over the faujasite catalyst continuously at a rate of 40 cc./min. at atmospheric pressure and at catalyst temperatures of 300°, 330°, and 360° C.

The effluent gases from the Pyrex tube at each catayslt temperature were passed through distilled water containing a known aliquot of 0.001 N HCl. After appropriate periods of time, i.e., about one-half hour, the acid solution treated with the effluent gases was back-titrated to a bromthymol blue end point. The nitrogen fixation rate was calculated from the difference between the final and initial titer of the acid solution. The rates calculated as ammonia synthesis was shown by the following data:

| Catalyst temperature° C.: | Synthesis rate, microequiv. $NH_3$/hr. |
|---|---|
| 300 | 1.3 |
| 330 | 2.4 |
| 360 | 4.5 |

Example III

Two grams of the iron-containing faujasite described in Example I was pretreated at 360° C. with the synthesis gas stream containing 3 moles of hydrogen per one mole of nitrogen at a flow rate of 20 cc./min. for 16 hours. Then the flow rate of the synthesis gas was raised to 40 cc./min. and the rates of ammonia syntheses were determined by the titration method set fort hin Example II at catalyst temperatures of 300° and 360° respectively with the resulting data shown below.

Catalyst temperature, °C.: Synthesis rate, Microequiv. NH₃/hr.
300 ---------------------------------------- 5.4
360 ---------------------------------------- 8.5

From the data presented in Examples II and III it is apparent that extended pretreatment of the catalyst with a reducing atmosphere substantially enhances its activity for ammonia synthesis. Even more surprising, however, is the low temperatures, i.e., 300°–360° C. at which the synthesis was successfully conducted and the unusually low activation energy the reaction had. Further, inasmuch as the "ammonia" as such was not isolated beyond making a determination therefor with Nessler's reagent, which reagent can react with nitrogen bases other than ammonia, there is reason to believe that, in fact, elemental nitrogen was catalytically reacted to form a water soluble basic nitrogen compound.

Example IV

Decomposition of ammonia was effected in several runs carried out by passing 20 cc./min. of Mathieson anhydrous ammonia over two grams of an aluminosilicate catalyst in a heated Vycor reactor tube. The resulting effluent stream was passed through a water scrubber to remove unreacted ammonia and the rate of evolution of water-insoluble gases was recorded at various catalyst temperatures. Unless otherwise noted, all catalyst materials were pretreated in a stream of air for one hour at 540° C.

Initially observations for catalytic activity were made while the catalyst was held at a temperature level of about 500–550° C. Often at these temperatures an "activation" period of variable duration was found. If no activity was observed after about one hour, the temperature of the catalyst was raised gradually until activity was noted, but no higher than about 650° C. Generally, the catalyst were held at the lowest temperature at which activity for decomposition of ammonia was observed.

Runs were also conducted to establish the behavior of the equipment and method in which ammonia was passed through an empty reactor, over a catalyst of platinum metal supported on alumina pretreated for 1.5 hours with hydrogen at 446° C. and over a catalyst of stainless steel powder pretreated for one hour with hydrogen at 500° C.

The behavior of the system is shown as Table 1 and the activities of various substantially nonreducible aluminosilicates are shown in Table 2 below.

TABLE 1

| Catalyst | Temp., °C. | NH₃, decomposition, percent |
|---|---|---|
| None | 650 | 0.0–0.2 |
| Pt/Al₂O₃ | 586 | 2.4 |
| Stainless steel powder | 614 | 20.4 |

TABLE 2

| Catalyst | Temp., °C. | NH₃, decomposition, percent |
|---|---|---|
| Na Zeolite X | 634 | 3.2 |
| Na Zeolite A | 631 | 8.0 |
| Na Mordenite ¹ | 626 | 16.7 |

¹ Norton Na—Zeolon powder.

This data shows that the crystalline sodium aluminosilicate salts of this invention exhibit particularly high levels of activity.

Example V

Using the equipment and method outlined in Example IV, decomposition of ammonia was effected in a heated Vycor reactor containing catalysts prepared by base exchanging clay bonded sodium zeolite X pellets with various metal cations. As shown by the following data, replacement of the sodium with cations of the transition metals substantially enhances the activity of the crystalline aluminosilicate.

TABLE 3

| Catalyst | Temp., °C. | NH₃, decomposition, percent |
|---|---|---|
| Na Zeolite X (no exchange) | 638 | 3.5 |
| Ag Exchanged "X" (Na=0.57 wt. percent) (Ag=36 wt. percent) | 650 | 0.7 |
| Cd Exchanged "X" (Na=1.3 wt. percent) (Cd=21.0 wt. percent) | 635 | 2.0 |
| Co Exchanged "X" (Na=8.9 wt. percent) (CoO=4.5 wt. percent) | 619 | 13.7 |
| Fe Exchanged "X" (3.8 wt. percent Fe) | 633 | 15.0 |
| Zn Exchanged "X" (6.0 wt. percent Na) (6.9 wt. percent Zn) | 642 | 12.9 |

It is noteworthy from the foregoing Table 3 that when extensive, e.g., 36 and 21 wt. percent, exchange of nonreducible sodium is effected with reducible elements, e.g., silver and cadmium, that very low NH₃ decomposition activities resulted.

Example VI

In this example, several runs were conducted using the equipment, method, and flow rates of Example IV to effect decomposition of ammonia over crystalline aluminosilicate catalysts that were prepared by adding various metal components prior to the crystallization of a sodium zeolite X type catalyst.

TABLE 4

| Metal component added | Temp., °C. | NH₃, decomposition, percent |
|---|---|---|
| None (ultra-pure Na-"X" with 30 p.p.m. Fe) | 636 | 2.1 |
| Vanadium, 0.1 wt. percent | 633 | 3.5 |
| Molybdenum, 30 p.p.m. | 640 | 3.2 |
| Chromium, 190 p.p.m. | 630 | 4.3 |
| Tungsten | 640 | 4.8 |
| Iron, 0.3 wt. percent | 548 | 10.7 |
|  | 638 | 43.8 |
| Iron, 1.2 wt. percent | 541 | 23.4 |
|  | 633 | 73.9 |
| Manganese, 0.5 wt. percent | 563 | 5.3 |
|  | ¹ 321 | 7.5 |

¹ Activity decreases with increasing temperatures.

Inspection of the above data shows that small additions of iron and manganese greatly improve the activity of the aluminosilicate catalyst and that in the case of manganese promote substantial decomposition of ammonia at temperature as low as about 300° C.

Example VII

The effects of a second air pretreatment on the aluminosilicates after use as catalysts for the decomposition of ammonia are shown by this example. Several runs were conducted from about 545° C. to 625° C. over the iron containing sodium zeolite X catalyst described in Example VI (Fe content of 0.3 wt. percent), then the catalyst was treated with air at 540° C. for one hour and placed back on stream. The following results were obtained by using the techniques described in Example IV.

TABLE 5

| After first pretreatment in air | | After second treatment in air | |
|---|---|---|---|
| Temp., °C. | NH₃ decomposition, percent | Temp., °C. | NH₃ decomposition, percent |
| 545 | 10.0 | 545 | 7.5 |
| 575 | 19.5 | 575 | 15.5 |
| 600 | 31.0 | 600 | 25.5 |
| 625 | 44.5 | 625 | 40.0 |

Example VIII

Fifty grams of a sodium faujasite are admixed with 200 grams of an iron-rich spinel of magnetite promoted with 3 grams of aluminum oxide. Then the composite composition is heated to a temperature of 550° C. for a period of 8 hours in an atmosphere of hydrogen. Analysis of this composition shows that it contains 73 percent by weight of elemental iron.

Example IX

Two grams of the catalyst composition prepared in Example VIII is placed in a Vycor reactor and heated to a temperature of about 300° C. Then 40 cc./min. of mixture of nitrogen and hydrogen in a ratio of one mole of nitrogen to three moles of hydrogen is passed over the catalyst for about 180 minutes. After about 240 minutes, the temperature of the catalysts was successively raised to 320, 340 and 360° C.

The ammonia found in the exit gases at each of these catalyst temperatures is determined by the titration technique described in Example II. Results of these runs are shown below in Table 7.

TABLE 7

| Temperature of catalyst, ° C. | Synthesis rate, Microequiv. $NH_3$/hr. |
|---|---|
| 300 | 1.2 |
| 320 | 2.3 |
| 340 | 4.9 |
| 360 | 7.0 |

Example X

Following the same general procedures described in Example IV additional runs were conducted over crystalline aluminosilicate catalysts prepared from sodium zeolite X by base exchange with various metal cations. The runs were carried out at about 537.7° C. over 20 ml. of the catalyst at flow rates of 96 or 146 ml./min. of ammonia. Table 6 below shows the results obtained with these catalysts.

TABLE 8

| Catalyst | $NH_3$ rate, ml./min. | $NH_3$ decomposition, percent |
|---|---|---|
| 13X (non-exchanged) | 146 | 1 |
| Cr-exchanged (4.4 wt. percent Cr) | 146 | 1 |
| Ni-exchanged (9.9 wt. percent Ni) | 146 | 34 |
| Co-exchanged (10.4 wt. percent Co) | 146 | [1] 2-58 |
| Zn-exchanged (6.5 wt. percent Zn) | 146 | 1 |
| Cu-exchanged (6.2 wt. percent Cu) | 146 | 3-5 |
| Fe-exchanged (3.8 wt. percent Fe) | 96 | 1 |

[1] Initial decomposition of 2% increased to 7% after 30 minutes. After a three-hour run in which ethane and ammonia at 637.8° C. were passed over catalyst, the catalyst was treated with nitrogen at 537.8° C. Ammonia was then passed over catalyst at 146 ml./min. to give decomposition of 35%; after about ½ hour decomposition increased to 58%.

It will be appreciated that crystalline substantially non-reducible aluminosilicate salts other than those used in the examples may be employed as catalysts for the present process and that various modifications and alterations may be made in the processes without departing from the spirit of the invention.

What is claimed is:

1. A process for the decomposition of ammonia which comprises contacting a charge containing ammonia with a catalyst comprising a crystalline alkali metal aluminosilicate salt having an ordered internal structure at a temperature of from about 300° C. to about 1000° C., said ordered internal structure having a defined pore size from about 3.5 A. to about 15 A. in diameter.

2. The process of claim 1 which the charge is at from about atmospheric to superatmospheric pressures.

3. The process of claim 1 in which the aluminosilicate has a silicon to aluminum ratio of at about 1.5 within an ordered internal structure.

4. The process of claim 1 in which the aluminosilicate is selected from the group consisting of faujasite and isomorphs thereof.

5. The process of claim 1 in which the aluminosilicate is contained in and distributed throughout a matrix binder.

6. The process of claim 1 in which the metal aluminosilicate salt has an ordered internal structure that is modified by the addition of a metal compound during the crystallization of the salt.

7. The process of claim 6 in which the amount of metal compound added is sufficient to provide from about 0.003 to 3.0 weight percent of the metal in the resulting crystal.

8. The process of claim 1 in which the metal aluminosilicate salt is admixed with a reducible iron-rich spinel having the general formula:

$$M'M''_2O_4$$

wherein M' is a metal selected from the group consisting of magnesium, zinc, manganese and ferrous iron, M" is a metal selected from the group consisting of aluminum, chromium, manganese, and ferric iron, with at least one of the metals represented by M' and M" being iron.

9. The process of claim 8 in which the spinel is admixed with the aluminosilicate salt in sufficient proportions to produce a catalyst containing at least 50 perecnt by weight of elemental iron upon reduction of the mixture.

10. A process for the decomposition of ammonia which comprises contacting a charge containing ammonia with a crystalline alkali metal aluminosilicate salt catalyst comprising mordenite, said ammonia being contacted under decomposition conditions.

11. A composite catalyst for the synthesis and decomposition of ammonia which comprises an admixture of a crystalline alkali metal aluminosilicate salt having an ordered internal structure with a defined pore size of from about 3.5 A. to about 15 A. in diameter and a reducible iron-rich spinel, said iron-rich spinel being in such proportions that upon reduction at least about 50 percent by weight of the catalyst is elemental iron.

12. The catalyst of claim 11 in which the reducible iron-rich spinel has the following general formula:

$$M'M''_2O_4$$

wherein M' is a metal selected from the group consisting of magnesium, zinc, manganese and ferrous iron, M" is a metal selected from the group consisting of aluminum, chromium, manganese, and ferric iron, with at least one of the metals represented by M' and M" being iron.

References Cited

UNITED STATES PATENTS

| 1,926,099 | 9/1933 | Jaeger | 23—198 |
| 2,550,389 | 4/1951 | Souby et al. | 23—198 |
| 3,102,003 | 8/1963 | Kummer | 23—212 |
| 3,253,887 | 5/1966 | Mattox et al. | 23—148 |

OSCAR R. VERTIZ, *Primary Examiner.*

H. S. MILLER, *Assistant Examiner.*